(12) United States Patent
Howard

(10) Patent No.: US 9,233,586 B1
(45) Date of Patent: Jan. 12, 2016

(54) DUAL FUNCTION TOW HOOK

(71) Applicant: FORD GLOBAL TECHNOLOGIES, LLC, Dearborn, MI (US)

(72) Inventor: Richard Howard, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/330,310

(22) Filed: Jul. 14, 2014

(51) Int. Cl.
*B60R 3/00* (2006.01)
*B60D 1/58* (2006.01)
*B60D 1/48* (2006.01)

(52) U.S. Cl.
CPC *B60D 1/58* (2013.01); *B60D 1/488* (2013.01); *B60R 3/00* (2013.01)

(58) Field of Classification Search
CPC .............. B60D 1/52; B60D 1/48; B60D 1/00; B60R 3/00
USPC ......................................................... 280/495
See application file for complete search history.

(56) References Cited

U.S. PATENT DOCUMENTS

| | | | | |
|---|---|---|---|---|
| 4,462,486 A | * | 7/1984 | Dignan ............................ | 182/91 |
| 4,750,753 A | * | 6/1988 | Dezern ....................... | 280/164.1 |
| 4,753,447 A | * | 6/1988 | Hall ............................... | 280/163 |
| 4,785,910 A | * | 11/1988 | Tonkovich ....................... | 182/92 |
| 4,911,264 A | * | 3/1990 | McCafferty .................... | 182/92 |
| 5,139,295 A | * | 8/1992 | Escobedo ....................... | 293/117 |
| 5,738,362 A | | 4/1998 | Ludwick | |
| 6,471,002 B1 | * | 10/2002 | Weinerman ..................... | 182/91 |
| 6,511,086 B2 | * | 1/2003 | Schlicht ......................... | 280/166 |
| 6,612,595 B1 | * | 9/2003 | Storer ............................ | 280/163 |
| 6,685,212 B1 | | 2/2004 | Penlerick et al. | |
| 6,840,526 B2 | * | 1/2005 | Anderson et al. ............. | 280/166 |
| 6,896,281 B2 | * | 5/2005 | Lenzen et al. ................. | 280/495 |
| 6,902,183 B2 | | 6/2005 | Rodgers | |
| 7,059,449 B2 | * | 6/2006 | Zhang ............................ | 182/150 |
| 7,219,911 B2 | * | 5/2007 | Sukonthapanich et al. .. | 280/166 |
| 7,222,873 B2 | * | 5/2007 | Rodgers ........................ | 280/495 |
| 7,396,030 B2 | * | 7/2008 | Badillo .......................... | 280/163 |
| 7,434,825 B2 | * | 10/2008 | Williams ....................... | 280/507 |
| 7,494,144 B1 | * | 2/2009 | Carr ............................... | 280/166 |
| 7,503,572 B2 | * | 3/2009 | Park et al. ...................... | 280/163 |
| D602,416 S | * | 10/2009 | Corwin ......................... | D12/203 |
| 7,717,444 B2 | * | 5/2010 | Fichter .......................... | 280/163 |
| 7,758,060 B2 | * | 7/2010 | Lopez et al. ................... | 280/495 |
| 8,038,164 B2 | * | 10/2011 | Stahl et al. ..................... | 280/166 |
| 8,393,629 B2 | | 3/2013 | Wotherspoon | |
| 2009/0278333 A1 | * | 11/2009 | Lopez et al. .................. | 280/495 |
| 2011/0285104 A1 | | 11/2011 | Wotherspoon | |
| 2013/0270791 A1 | * | 10/2013 | Anderson ..................... | 280/163 |

OTHER PUBLICATIONS

Allied Bolt Products, LLC, Tower Pole Step, Part #12680, Jun. 22, 2013.*
CARR Products Internet search for "Tow Hook Steps"; http://carr.com/steps/tow-hook-steps.html; 3 pages.

* cited by examiner

*Primary Examiner* — Joseph Rocca
*Assistant Examiner* — Michael Stabley
(74) *Attorney, Agent, or Firm* — Jason Rogers; King & Schickli, PLLC

(57) ABSTRACT

A dual function tow hook includes a body forming a tow hook and an integral step formed in the body. The integral step is recessed in an upper surface of the body and includes a first end wall and a second end wall. Further the integral step includes a grooved tread face between the first and second end walls.

5 Claims, 3 Drawing Sheets

DUAL FUNCTION TOW HOOK

TECHNICAL FIELD

This document relates generally to the automotive vehicle field and, more particularly, to a dual function tow hook that also serves as a convenient step for inspecting and servicing components in the engine compartment of the vehicle.

BACKGROUND

Tow hooks are often employed on an automotive vehicle, such as a truck, to allow a user to attach an article utilizing a tow strap or a chain. Typically, the tow hook is provided on a front end of the vehicle. The tow hook may be attached to an object that is to be towed by the vehicle or the vehicle with the tow hook may be attached to another vehicle or wench if the vehicle is to be towed or pulled when, for example, it is stuck in heavy mud or under other such conditions.

Typically, tow hooks are provided on larger more powerful vehicles such as trucks that have substantial towing capacity. Such vehicles are generally larger and taller often making it difficult to access the engine compartment in order to conduct servicing or repairs including, for example, checking and topping off fluid levels such as windshield washer fluid, transmission fluid, brake fluid, radiator fluid and engine oil.

This document relates to a dual function tow hook including an integral step with a safe non-slip foothold for easy, elevated access to the engine compartment of the vehicle.

SUMMARY

In accordance with the purposes and benefits described herein, a dual function tow hook is provided. The dual function tow hook comprises a body forming a tow hook and an integral step formed in the body. In one possible embodiment the body includes a first free end and a second free end. The integral step is formed in the body between the first and second free ends.

In one possible embodiment the integral step is recessed in an upper surface of the body and includes a first end wall and a second end wall. Further the integral step includes a grooved tread face between the first end wall and the second end wall. In addition the body includes an arcuate inner surface between the first and second end walls of the integral step.

In accordance with an additional aspect, a method is provided for aiding in the servicing of a vehicle. That method includes equipping the vehicle with a tow hook including an integral step that functions to provide a secure foothold above the ground from which an individual may inspect and service engine compartment components.

The method further includes recessing the step so as to provide end walls to better secure a foot of an individual thereon. Still further the method includes providing a grooved tread face on the recessed step between the end walls.

In accordance with an additional aspect a vehicle is provided incorporating the dual function tow hook described.

In the following description, there is shown and described several preferred embodiments of the dual function tow hook. As it should be realized, the dual function tow hook is capable of other, different embodiments and its several details are capable of modification in various, obvious aspects all without departing from the dual function tow hook as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles thereof. In the drawings.

Reference will now be made in detail to the present preferred embodiment of the dual function tow hook, as illustrated in the accompanying drawings.

DETAILED DESCRIPTION

Figure 1:
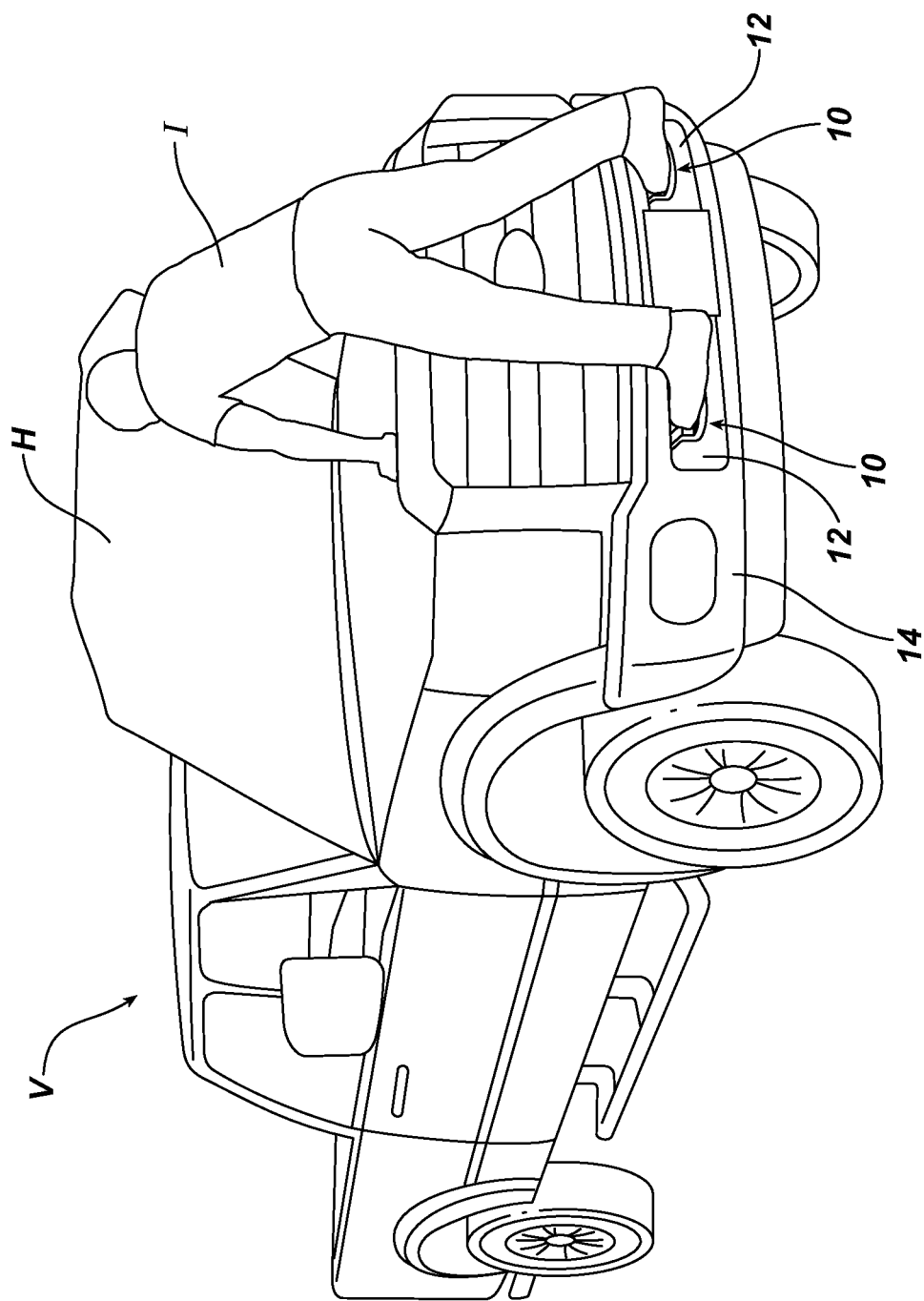
FIG. 1 is a perspective view of a pickup truck incorporating two dual function tow hooks upon which an individual is standing while inspecting the engine compartment of the vehicle.

Reference is now made to FIG. 1 illustrating a truck T including two dual function tow hooks 10 symmetrically positioned about the centerline of the truck in two recesses 12 of the bumper assembly 14.

Figure 2:
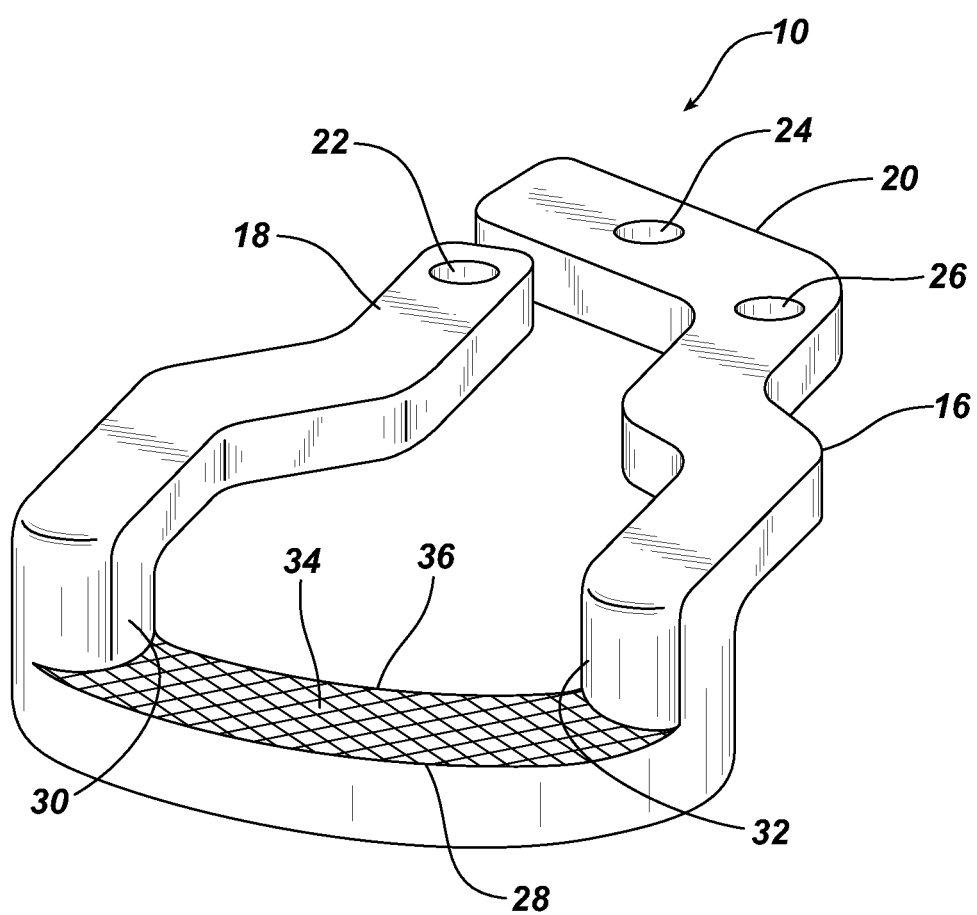
FIG. 2 is a detailed perspective view of the dual function tow hook.
Figure 3:
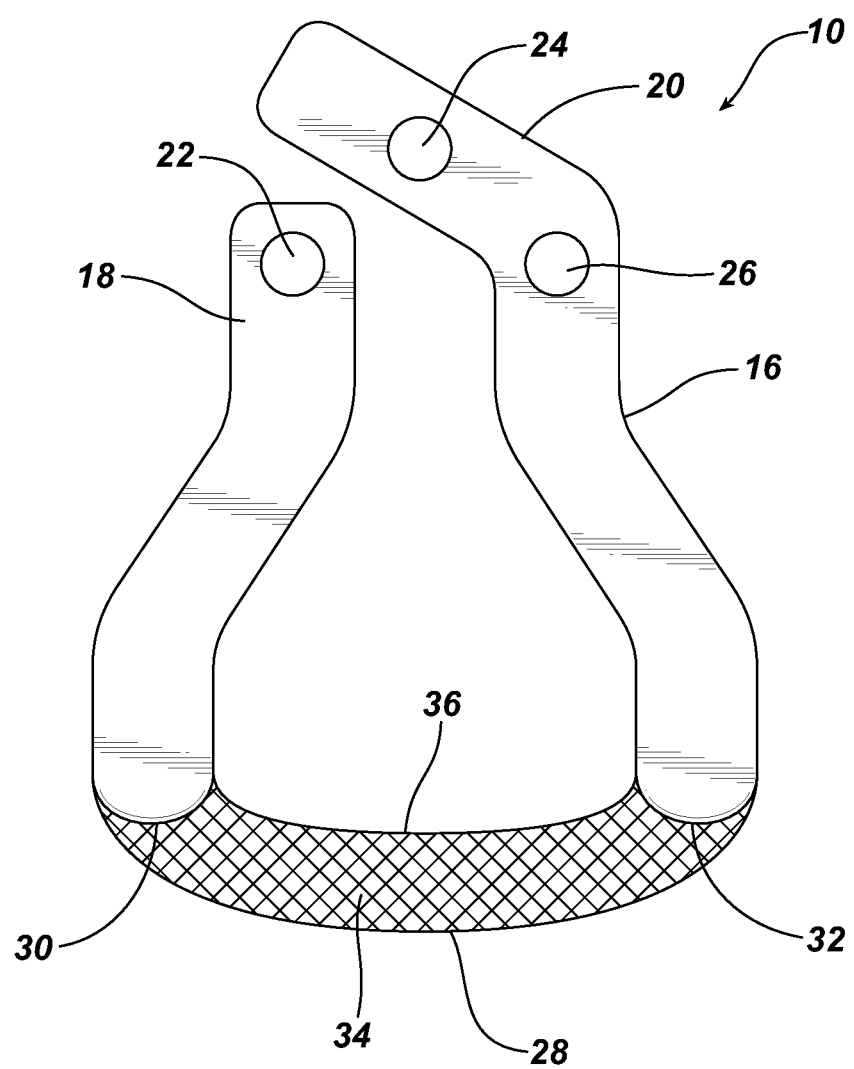
FIG. 3 is a top plan view of the dual function tow hook.

Reference is now made to FIGS. 2 and 3 which are detailed illustrations of a dual function tow hook 10. As illustrated, the tow hook 10 comprises a body 16 produced from high strength steel or other appropriate material. In the illustrated embodiment, the body 16 includes a first free end 18 and a second free end 20. First free end 18 includes a first mounting aperture 22, while the second free end 20 includes a second mounting aperture 24 and a third mounting aperture 26. These mounting apertures are positioned to match mating apertures in the frame (not shown) of the trunk T to which they are secured by cooperating bolts and fasteners (not shown). The bolts and fasteners provide a secure connection between the tow hook 10 and the frame of the vehicle V with adequate strength to safely allow towing using the tow hooks.

As further illustrated in FIGS. 2 and 3, the body 16 includes an integral step 28 at a point intermediate and substantially opposite the free ends 18, 20. As illustrated, integral step 28 is recessed in the upper surface of the body 16 so as to lie in a different plane then the free ends 18, 20. As illustrated, the integral step 28 includes a first end wall 30 and a second, opposite end wall 32. A grooved tread face 34 extending across the top of the step 28 between the first and second end walls 30, 32 provides a nonslip surface for an individual I to place his foot thereon and provide easy, elevated access to the engine compartment under the open hood H of the vehicle (see also FIG. 1). For purposes of this document, the terminology "grooved tread face" should be given its broadcast possible meaning so that it includes and covers any form of grooving or roughened surface provided for the specific purpose of improving foot traction. This includes patterned and random traction features.

As should be further appreciated from viewing FIG. 3, the inner surface 36 of the step 22 between the end walls 30, 32 facing the free ends 18, 20 is arcuate. During towing, this arcuate surface 36 serves a self-centering function so that towing chains or straps tend to move toward the center of the arcuate surface directly between the end walls 30, 32.

In accordance with an additional aspect, it should be appreciated that a method is provided to aid in the servicing of a vehicle. The method comprises equipping a vehicle V with a dual function tow hook 10 including an integral step 22 that functions to provide a secure foothold above ground from which an individual I may inspect and service engine compartment components. Still further the method includes recessing the step 22 so as to provide end walls 30, 32 to better secure a foot of an individual thereon. Further the method includes providing a grooved tread face 34 on the recessed step 22 between those end walls 30, 32. Significantly, the end walls 30, 32 of the step 22 are spaced just wider than the shoe of an operator and function with the grooved tread face 34 to provide a safe and secure foothold which is slip resistant. Accordingly, an individual I may conveniently and confidently use the dual function tow hook 10 on either side of the vehicle to inspect, access and service components within the engine compartment under the hood H of the vehicle. This would be difficult or impossible to do in the absence of the dual function tow hooks 10 because the overall height of the vehicle limits access to engine compartment components.

The foregoing has been presented for purposes of illustration and description. It is not intended to be exhaustive or to limit the embodiments to the precise form disclosed. Obvious modifications and variations are possible in light of the above teachings. For example, while the illustrated tow hook 10 has two free ends 18, 20, it should be appreciated that it could have a single mounting lug. All such modifications and variations are within the scope of the appended claims when interpreted in accordance with the breadth to which they are fairly, legally and equitably entitled.

What is claimed is:

1. A dual function tow hook, comprising:
a body forming a tow hook, wherein said body is asymmetrically-shaped and includes a first free end and a second free end, wherein each of the first and second free ends have at least one mounting aperture for mounting the body of the tow hook directly to a vehicle; and
an integral step formed in said body, wherein said integral step is recessed in an upper surface of said body and has a grooved tread face extending between a first end wall and a second end wall, said integral step being formed in said body between said first and second free ends.

2. The dual function tow hook of claim 1, wherein said body includes an arcuate inner surface between said first and second end walls of said integral step.

3. A vehicle incorporating the dual function tow hook of claim 2.

4. A vehicle incorporating the dual function tow hook of claim 1.

5. A method to aid in servicing of a vehicle, comprising:
equipping said vehicle with a tow hook having an asymmetrically-shaped body and a first free end and a second free end, wherein each of the first and second free ends have at least one mounting aperture for mounting the body of the tow hook directly to said vehicle;
providing an integral step recessed in an upper surface of said body and having a grooved tread face extending between a first end wall and a second end wall, said integral step being formed in said body between said first and second free ends; said integral step functioning to provide a secure foothold from which an individual may inspect and service engine compartment components.

* * * * *